United States Patent [19]
Grossi, III et al.

[11] Patent Number: 5,322,981
[45] Date of Patent: Jun. 21, 1994

[54] VELOCITY CHANGE SENSOR WITH A CYLINDRICAL MAGNET

[75] Inventors: Carl T. Grossi, III, Wharton; Gerard Humphreys, Boonton Township, Morris County; Timothy D. O'Keeffe, Wharton, all of N.J.

[73] Assignee: Breed Automotive Technology, Inc., Lakeland, Fla.

[21] Appl. No.: 24,821

[22] Filed: Mar. 1, 1993

Related U.S. Application Data

[63] Continuation of Ser. No. 713,170, Jun. 11, 1991, abandoned.

[51] Int. Cl.⁵ ................... G01P 15/135; H01H 35/14
[52] U.S. Cl. ............................................. 200/61.45 M
[58] Field of Search ............. 73/517 R; 200/61.45 M, 200/61.45 R, 61.53; 280/735

[56] References Cited

U.S. PATENT DOCUMENTS

| 3,774,128 | 11/1973 | Orlando | 200/61.45 M |
| 4,082,927 | 4/1978 | Beckwith | 200/61.45 M |
| 4,329,549 | 5/1982 | Breed | 200/61.45 M |
| 4,399,887 | 8/1983 | Okada | 200/61.45 M |
| 4,816,627 | 3/1989 | Janotik | 200/61.45 M |
| 5,012,050 | 4/1991 | Sewell | 200/61.45 R |

FOREIGN PATENT DOCUMENTS 2236857 4/1991 United Kingdom .

Primary Examiner—John E. Chapman
Attorney, Agent, or Firm—Kane, Dalsimer, Sullivan, Kurucz, Levy, Eisele & Richard

[57] ABSTRACT

An accelerometer for sensing velocity changes particularly suited for passenger restraint systems in a motor vehicle for the deployment of an air bag includes a housing with contact blades and a magnetically biased contacting element. The contacting element is arranged to move toward the contact blades when a deceleration exceeding a threshold level is sensed. A cylindrical permanent magnet is used to bias the contacting element. The magnet is contained in an insert, and a seal is disposed between the insert and the housing.

16 Claims, 2 Drawing Sheets

VELOCITY CHANGE SENSOR WITH A CYLINDRICAL MAGNET

This application is a continuation of application Ser. No. 07/713,170, filed Jun. 11, 1991, now abandoned.

BACKGROUND OF THE INVENTION

1. Field of the Invention

This invention pertains to a velocity change sensor or accelerometer used in motor vehicles for detecting sudden changes in velocity and for activating in response a passenger restraining device such as an air bad. More particularly, this device includes an element which moves to a preset position in response to a sudden deceleration to activate a pair of contact blades.

2. Background of the Invention

Studies have been made which indicate that injuries in motor vehicle accidents, especially at high speeds, can be substantially reduced or eliminated by the use of passenger restraint systems. (The term "passenger" is used to cover the driver of a car as well.) These systems include an inflatable balloon usually termed an air bag which normally is stored away in the instrument panel or the steering wheel. When the motor vehicle is subjected to a sudden deceleration, the air bag is inflated and is deployed automatically in a position which cushions the passengers, restrains their movement and prevents contact between them and the automobile interior such as the windshield, the steering wheel, the instrument panel and so on. Of course, a crucial element of all such systems is the velocity change sensor or accelerometer which initiates the inflation and deployment of the air bags. The motion of the motor vehicle must be carefully and precisely monitored so that the air bags can be deployed very fast, before the passengers suffer any substantial injury.

A velocity change sensor is disclosed in U.S. Pat. No. 4,329,549 assigned to the same company as the present invention. This sensor comprises a tubular housing surrounding a metallic shell, a metal ball and a magnet biasing the ball toward a first end of the shell. At the second end of the shell there is a pair of electrical contact blades. The sensor is positioned in the motor vehicle in an orientation such that when the motor vehicle experiences a deceleration which exceeds a preset level, the ball moves from the first toward the second end, making contact with the two blades. Because the blades and the ball are made of an electrically conducting material, when the ball contacts the blades, an electrical path is established between the two blades. This electrical path is used to initiate a signal for the deployment of the air bags.

One problem with the device shown in U.S. Pat. No. 4,329,549 is that it requires a relatively large magnet.

OBJECTIVES AND SUMMARY OF THE INVENTION

In view of the above mentioned disadvantages of the prior art, it is an objective of the present invention to provide an accelerometer with smaller dimensions.

Other objectives and advantages of the invention shall become apparent from the following description. An accelerometer constructed in accordance with the invention includes a housing with at least one pair of contact blades; and an element moving in a predetermined path in response to a change in velocity of the motor vehicle. The two contact blades are disposed in the path of the moving element in such a manner that an electrical contact path is established between the blades by the moving element. A magnetic insert disposed along the axis of said path is used to generate a magnetic field for biasing the ball.

DETAILED DESCRIPTION OF THE INVENTION

Figure 1:
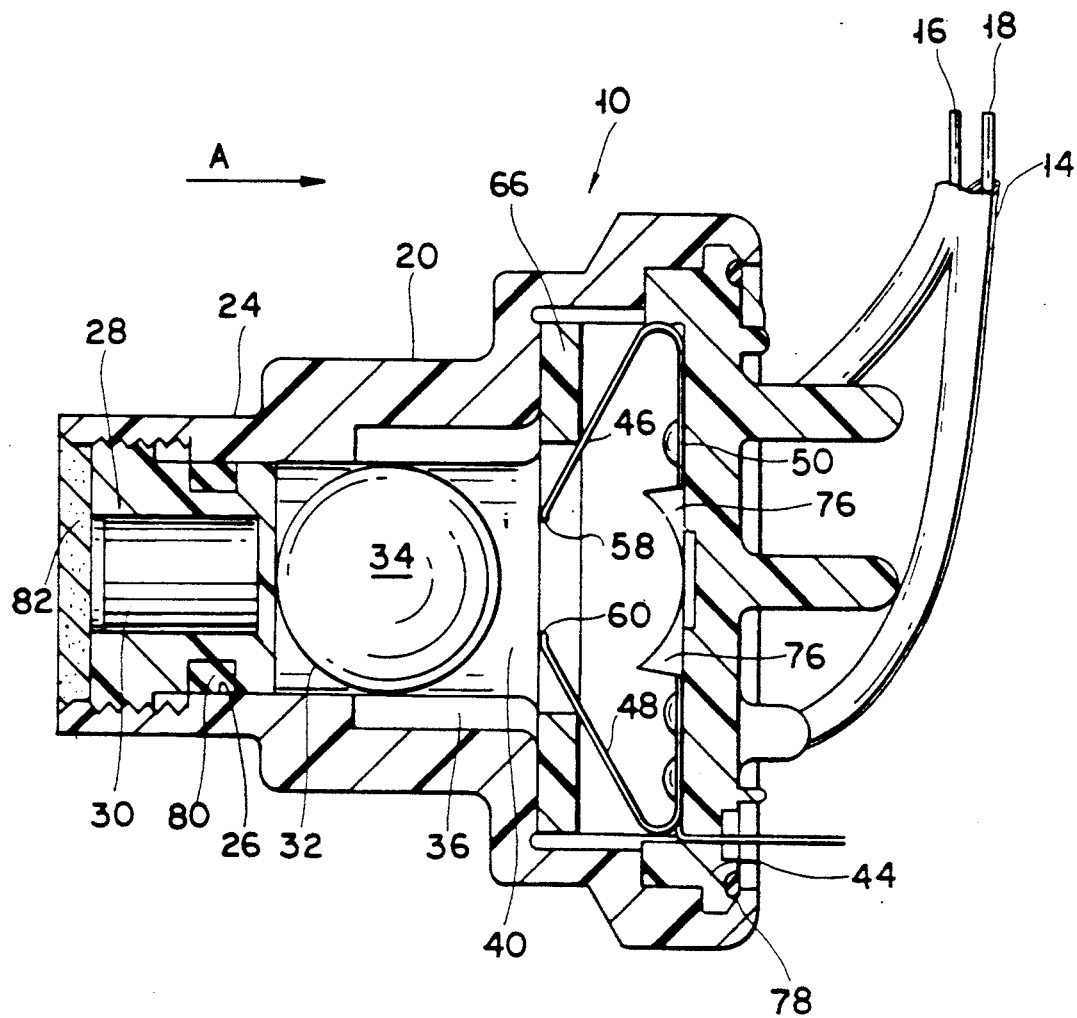
FIG. 1 shows a side cross-sectional view of an accelerometer constructed in accordance with the invention.

Turning now to the Figures, an accelerometer or velocity change sensor 10 constructed in accordance with this invention is usually mounted on the motor vehicle (not shown). The sensor is connected by a cable 14 by at least two conductors 16, 18 to a control device for the deployment of the air bag.

The sensor 10 has a tubular body 20 and terminating at one end with a reduced portion 24 with an opening 26. Opening 26 holds insert 28 with a cylindrical or slug-shaped permanent solid magnet 30. The body 20 and the inert 28 are preferably made of a plastic material. The housing defines a chamber 32 which holds a metal ball 34. Housing 20 is provided with radial walls 36 which define a cylindrical passageway 40 for ball 34.

Opposite opening 26, body 20 is terminated with an axially disposed plastic cap 44. Cap 44 may be attached to body 20 by any well known means such as with an adhesive, or by sonic welding. Mounted on cap 44 there are two blades 46, 48. Each of these blades is secured to cap 44 by a pin 50 or other similar means known in the art, and is made of a relatively thin and flat conductive material such as copper. Blades 46 and 48 are terminated at their upper portions with respective curved sections 58 and 60. Disposed within body 20, there is a plastic disk 66, for biasing the blades 46, 48 toward positions shown in FIG. 1, (as described more fully in commonly assigned U.S. application Ser. No. 417,914, filed Oct. 6, 1989).

Cap 44 also includes internal projections 76 facing inwardly toward ball 34. A sealant 78 is applied between the cap 44 and body 20 to keep the sensor sealed. Similarly, a seal and/or an O-ring 80 is applied between insert 28 and body 20. If required, a potting material 82 may also be used to maintain insert 28 in place.

Figure 2:
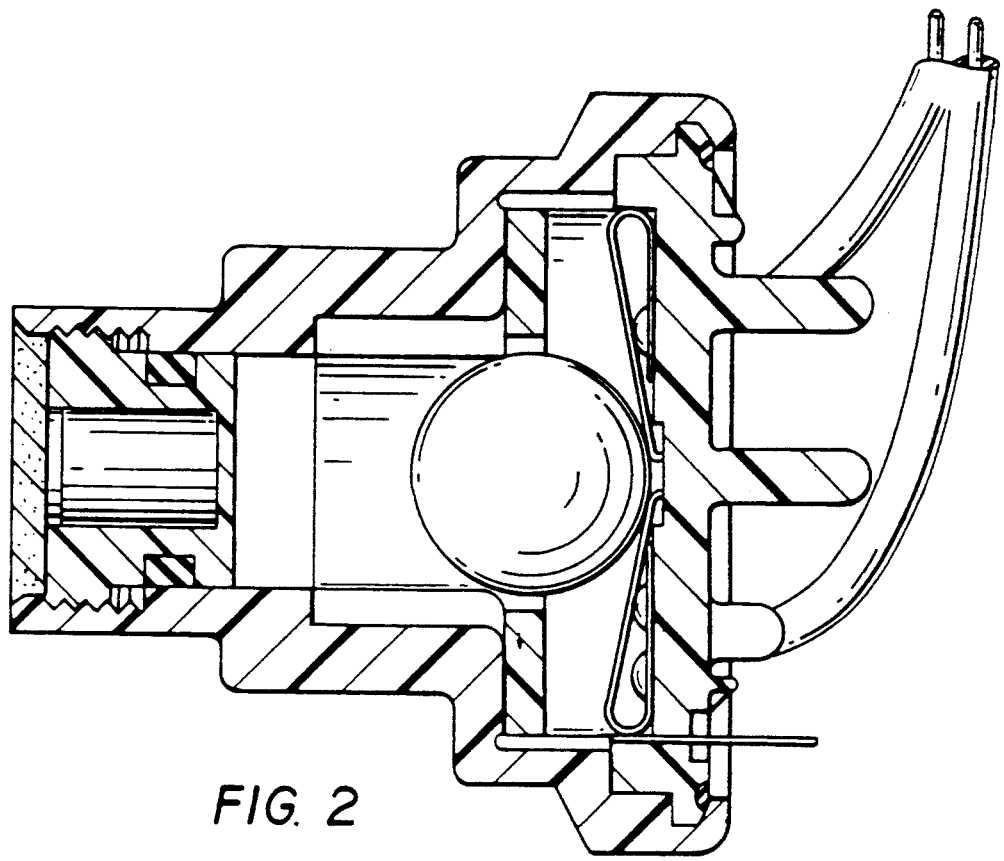
FIG. 2 shows a side cross-sectional view of the accelerometer of FIG. 1 with the ball moved by a sudden deceleration.

The sensor 10 operates in the following manner. Permanent magnet 30 generates a magnetic field, and ball 34 is made of a magnetically permeable material. The magnet 30 is arranged and positioned on the longitudinal axis of the path defined by passageway 40 to bias ball against insert 28 as shown in FIG. 1. The sensor is positioned within a motor vehicle (for example, in the engine or the passenger compartment) in such an orientation that, if the vehicle experiences a deceleration, ball 34 is urged in the direction indicated by arrow A. If this deceleration is greater than a preselected threshold level (defined, for example, by the dimensions of the sensor and the strength of the field generated by the magnet) the force of deceleration overcomes the force of the magnetic field and the ball 34 is projected in direction A along the passageway 40. As the ball moves through the passageway, it comes into contact (relatively simultaneously) with the tips of the blades 46, 48. Ball 34 is preferably coated with material having a very low electric resistance whereby when ball 34 contacts the blades, an electric path is formed therebetween. The ball keeps moving in the direction A bending blades 46, 48 in the same direction until it is brought to stop by projection 76 as seen in FIG. 2. The contact between blades 46, 48, may be used to generate an electrical signal which may be sent, for example, on conductor 14, 16 to a passenger restraint apparatus such an air bag assembly (not shown) for the deployment of the system.

Figure 3:
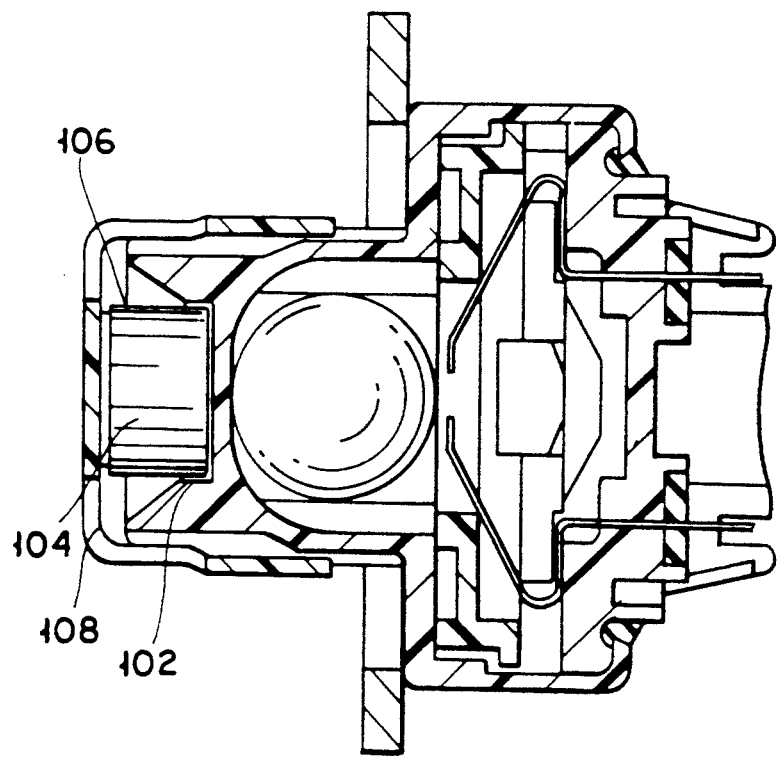
FIG. 3 shows a cross-sectional view of an alternate embodiment of the invention.

In the embodiment of FIG. 3, instead of an insert, body 100 is formed with a first frustoconical depression 102. A cylindrical solid or slug-shaped magnet 104 is inserted in depression 102 and retained therein by a sealant as at 106. A cap 108 is provided over the magnet 104 for protection.

Obviously, numerous modifications may be made to the invention without departing from its scope as defined in the appended claims.

We claim:

1. An accelerometer for sensing velocity changes in a motor vehicle, said accelerometer comprising:
    a housing having a first end and a second end, and an interior chamber defining a path there between, with said path having a longitudinal axis, said second end forming an opening having an opening diameter;
    contact means disposed at said first end for establishing an electrical circuit, said contact means having one of an open and a closed state;
    an insert disposed in said opening and having an insert diameter equal to said opening, said insert including a solid permanent magnet on said longitudinal axis;
    sensor means disposed in said housing, said sensor means being made of a magnetic permeable material, and being biased toward said second end by said permanent magnet means, said sensor means being constructed and arranged to move from said second to said first end in response to an acceleration to change the state of said contact means; and
    a seal disposed between said insert and said housing.

2. The accelerometer of claim 1 wherein said contact means includes a pair of blades.

3. The accelerometer of claim 2 wherein said sensor means comprises a ball.

4. The accelerometer of claim 3 wherein said ball is coated with a conductive material to establish an electric path between said blades at said first end.

5. An accelerometer for sensing changes of velocity in a motor vehicle, said accelerometer comprising:
    a tubular housing having a first end, and a second end, and a longitudinal axis, said second end defining an opening having an opening diameter;
    contact blades disposed at a first end for establishing an electrical circuit, said contact blades having an open and a closed state;
    an insert disposed in said opening and having an insert diameter equal to said opening diameter and holding a solid permanent magnet adjacent to said second end on said longitudinal axis; and magnet sensor means movably disposed within said housing and biased toward said second end by said permanent magnet, said magnet sensor means moving toward said first end to change the state of said contact blades in response to an acceleration; and
    a seal disposed between said insert and said housing.

6. The accelerometer of claim 5 wherein said sensor means is coated with a conductive material to establish an electric path between said contact blades.

7. The accelerometer of claim 5 wherein said sensor means comprises a ball.

8. An accelerometer for sensing changes of velocity in a motor vehicle, said accelerometer comprising:
    a tubular housing having a longitudinal axis, a first end, and a second end, said second end including an internal wall and a tubular extension projecting away from said internal wall and having an opening;
    contact blades disposed at said first end to form an electric circuit;
    an insert disposed in said opening and including a solid permanent magnet disposed in said extension adjacent to said internal wall on said longitudinal axis;
    magnet sensor means movably disposed within said housing and biased against said second end by said permanent magnet, said magnetic sensor means moving toward said first end to close said contact blades in response to an acceleration; and
    a seal disposed between said insert and said housing.

9. The accelerometer of claim 8 further comprising securing means for securing said insert to said housing.

10. The accelerometer of claim 8 wherein said permanent magnet is cylindrical.

11. The accelerometer of claim 8 further comprising a cap at said first end for holding said contact blades.

12. The accelerometer of claim 11 further comprising stop means secured to said cap for stopping said magnetic sensor means.

13. The accelerometer of claim 8 wherein said insert is threadedly engaged to said housing extension.

14. The accelerometer of claim 8 wherein said seal is disposed peripherally around said insert.

15. The accelerometer of claim 8 wherein said insert has an axial end disposed outside said housing.

16. The accelerometer of claim 8 wherein said sensor means has a cross sectional dimension larger than said permanent magnet.

* * * * *